No. 609,620. Patented Aug. 23, 1898.
W. LEIST.
FIELD SPOOL WINDING MACHINE.
(Application filed Aug. 14, 1897.)
(No Model.) 3 Sheets—Sheet 1.

Attest:
M. J. Gallagher
Frank Todd

Inventor:
William Leist,
by John E. Jones,
his attorney.

THE NORRIS PETERS CO., PHOTO-LITHO., WASHINGTON, D. C.

No. 609,620. Patented Aug. 23, 1898.
W. LEIST.
FIELD SPOOL WINDING MACHINE.
(Application filed Aug. 14, 1897.)
(No Model.) 3 Sheets—Sheet 2.

Attest:
M. J. Gallagher
Frank Todd

Inventor:
William Leist,
by John E. Jones
his attorney.

THE NORRIS PETERS CO., PHOTO-LITHO., WASHINGTON, D. C.

No. 609,620. Patented Aug. 23, 1898.
W. LEIST.
FIELD SPOOL WINDING MACHINE.
(Application filed Aug. 14, 1897.)
(No Model.) 3 Sheets—Sheet 3.
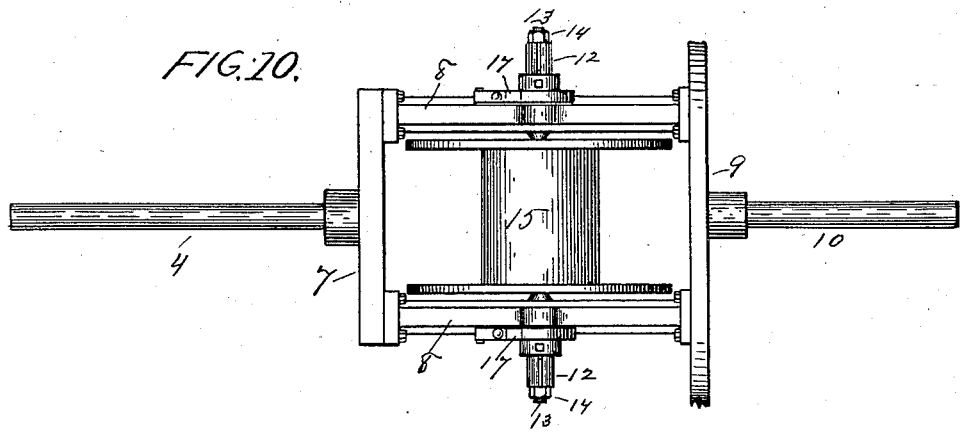
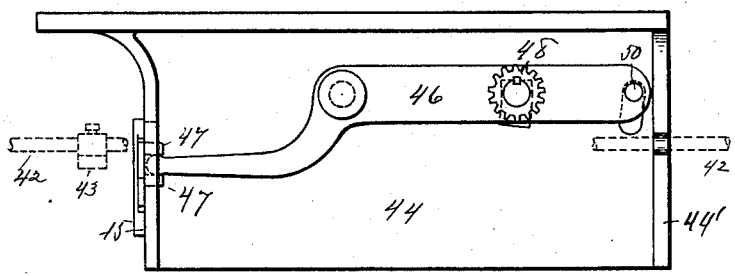
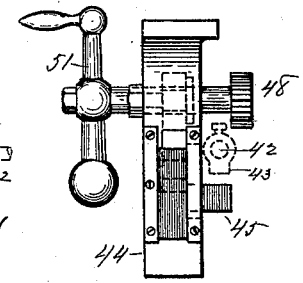
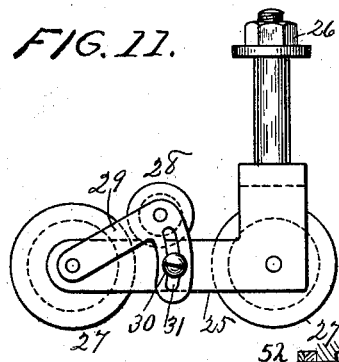
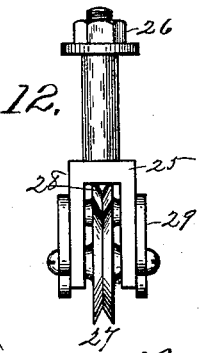
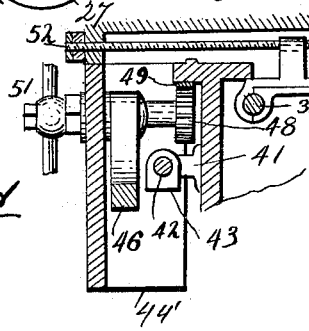
Attest:
M. J. Gallagher.
Frank Todd
Inventor:
William Leist,
by John E. Jones,
his attorney.

UNITED STATES PATENT OFFICE.

WILLIAM LEIST, OF NORWOOD, OHIO.

FIELD-SPOOL-WINDING MACHINE.

SPECIFICATION forming part of Letters Patent No. 609,620, dated August 23, 1898.

Application filed August 14, 1897. Serial No. 648,241. (No model.)

*To all whom it may concern:*

Be it known that I, WILLIAM LEIST, a citizen of the United States, residing at Norwood, in the county of Hamilton and State of Ohio, have invented a new and useful Field-Spool-Winding Machine, of which the following is a specification.

My invention relates to machines for winding field spools or forms for motors, dynamos, transformer-coils, &c., and is especially adapted to winding spools that are not cylindrical—as, for instance, those that are square or irregular.

The objects of my invention are to provide such a machine with means whereby it may be adjusted very accurately for the different-sized wires used, to utilize electricity for operating the reversing mechanism, and to render the machine automatic in its operations, and to produce a machine that will take the wire-supply spools on the market and deliver the wire to the spools to be wound in an accurate and expeditious manner.

With these objects in view my invention consists in the construction and combination of novel features, as will be hereinafter more particularly set forth.

Referring to the accompanying drawings, in which the same reference-numerals indicate the same parts in each of the views in which they occur—

Figure 1:
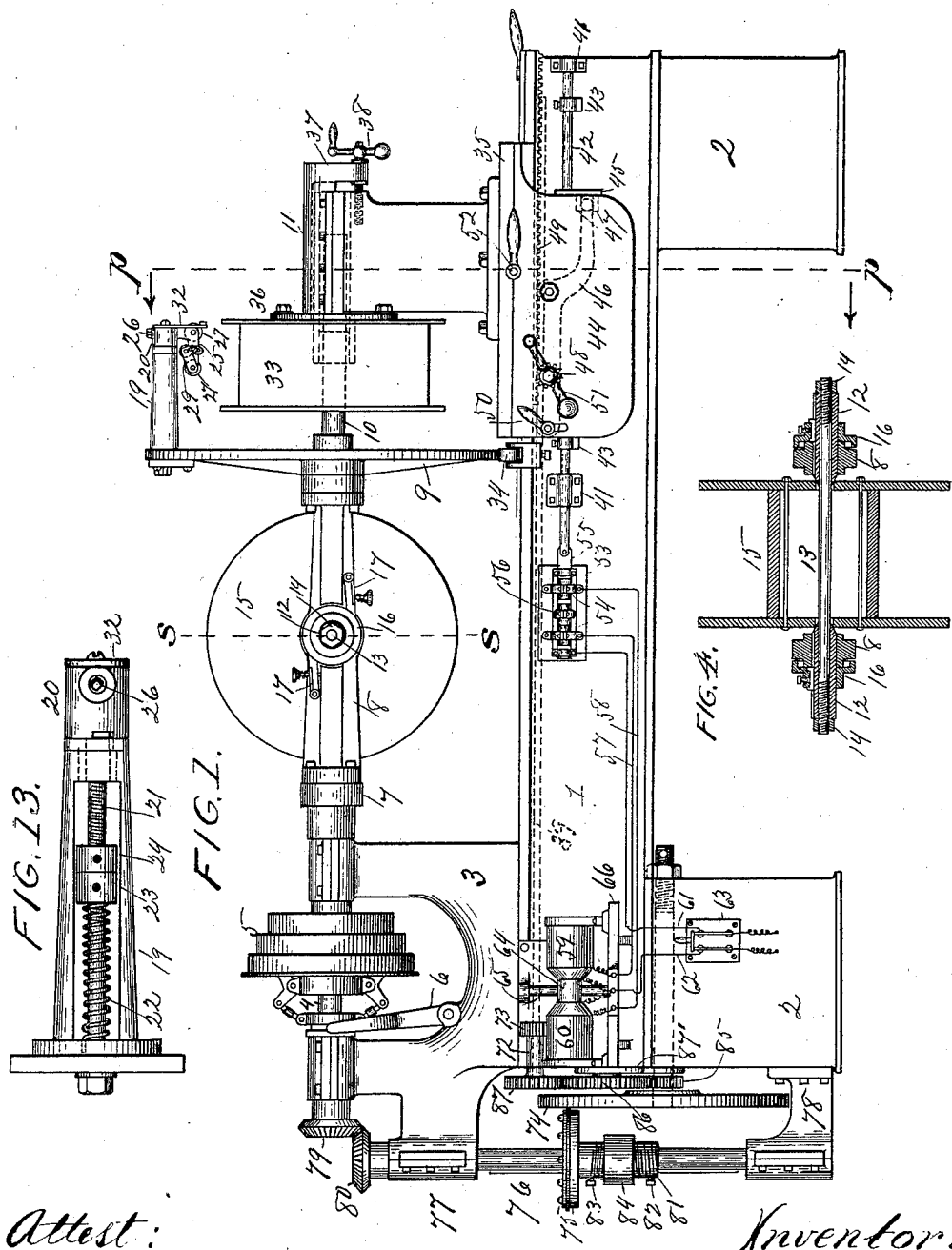
Figure 2:
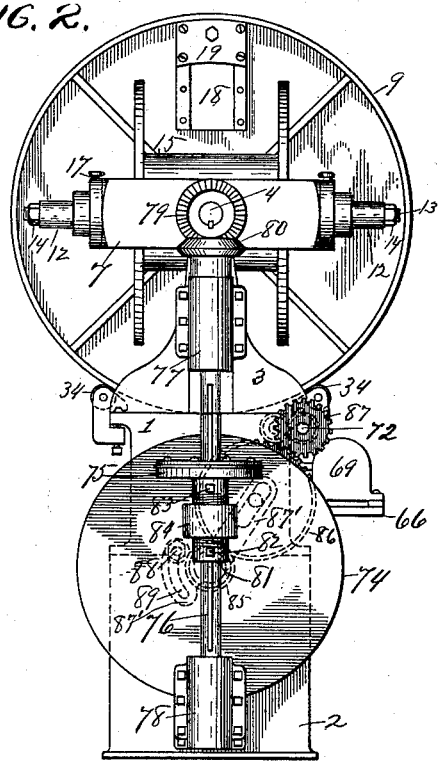
Figure 3:
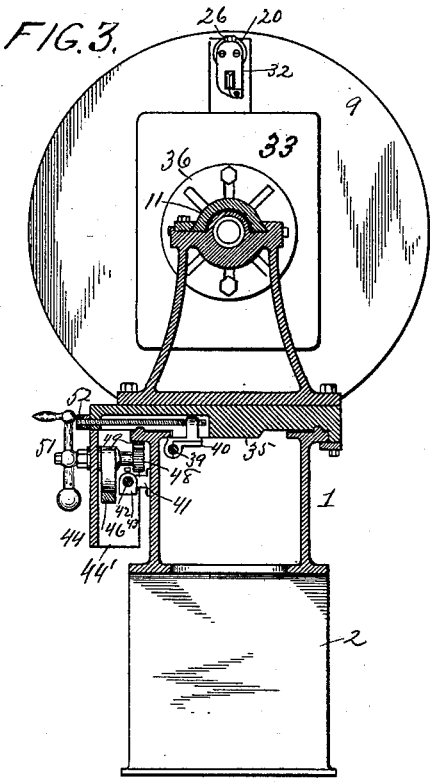
Figure 5:
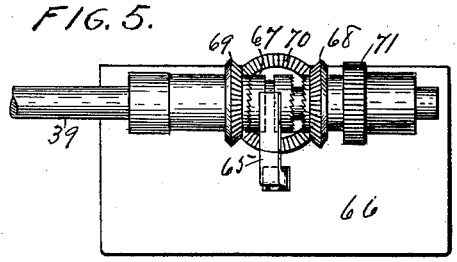
Figure 6:
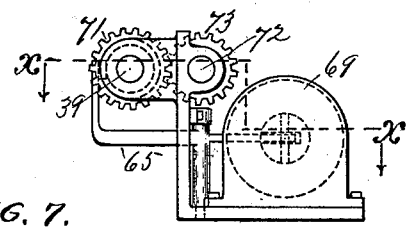
Figure 7:
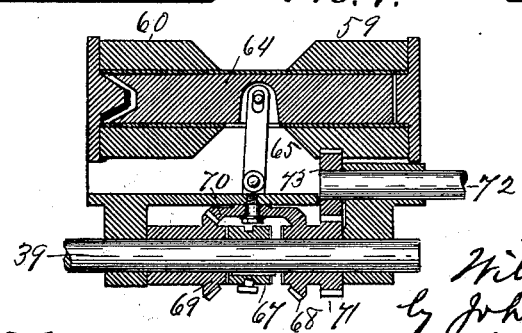

Figure 1 is a longitudinal front elevation of the entire machine. Fig. 2 is an end elevation, left side. Fig. 3 is a sectional elevation on line $p\,p$ of Fig. 1. Fig. 4 is a transverse section on line $s\,s$ of Fig. 1, showing the wire-supply spool. Fig. 5 is a bottom plan view of the solenoid clutch-gear seen in Fig. 7. Fig. 6 is an end elevation of the solenoid clutch device. Fig. 7 is a sectional plan on line $x\,x$ of Fig. 6. Fig. 8 is an inside elevation of the carriage-apron. Fig. 9 is an end elevation of the apron. Fig. 10 is a plan view of the wire-supply spool, the shaft and the flange of the latter being broken off, as seen in Fig. 1. Fig. 11 is a front elevation of the flier tension device seen in Fig. 1. Fig. 12 is an end elevation of Fig. 11. Fig. 13 is a plan view of the flier-arm seen in Fig. 1, and Fig. 14 is an enlarged detail view of a portion of the machine as shown in Fig. 3.

Referring more particularly to the drawings, 1 indicates the frame or bed plate of the machine, which may be supported upon a base or pedestals 2 2 in the manner of the ordinary lathe. At one end of the bed is a head 3, in which is journaled a shaft 4, on which is mounted a clutch cone-pulley 5, which may be thrown into and out of gear by the lever 6. Secured to one end of shaft 4 is a saddle or winding frame comprising a yoke 7, which forms one of the end pieces of the frame and is rigidly secured to the shaft 4, two saddle or side pieces 8 8, and a face plate or disk 9, which forms the other end piece of the frame. Projecting from the center of the plate 9 in a line with the main shaft 4 is a short shaft 10, the free end of which is supported by a fixed bearing in a head 11.

Each of the saddle or side pieces of the frame is provided with a bearing for a sleeve 12, through which passes a short rod or shaft 13. Each end of the rod is screw-threaded and provided with a nut 14, which bears against the outer end of a sleeve and forces the inner end of the sleeve, which is tapered or cone-shaped, into the hole in the end of the supply-spool 15, thereby centering the spool on the shaft within the frame. Adjustably secured to the outer end of each sleeve by means of an ordinary set-screw and keyway is a flanged collar 16, which prevents longitudinal movement of the shaft and sleeves in the frame. A suitable brake 17 is arranged to bear against the periphery of the collar and prevent the rotation of the spool faster than is desired when the wire is being drawn from it by the operation of the machine. By mounting the supply-spool in this way, with its axis of rotation at right angles to the axis of rotation of the frame, it is obvious that twisting and breakage of the wire drawn from the supply-spool are prevented.

The plate 9 is provided with an opening 18 near its periphery, within which a flier-arm 19 is secured, so as to be adjustable toward or from the center of the plate to clear a larger or smaller spool being wound. A head 20 is swiveled to the outer end of the arm by means of a shaft 21, which passes through the arm. A coiled spring 22 surrounds the shaft and is connected at one end to the base and has its other end secured to a nut 23, that is locked in any desired position upon the shaft by a lock-nut 24. An L-shaped extension or saddle 25 is secured to the head by means of a shank and nut 26. Two grooved rollers 27 are journaled in the saddle, and a smaller grooved roller 28 is journaled in another L-shaped piece or saddle 29 in position to be moved nearer to or farther from the two rollers, thereby regulating the tension upon the wire as it passes over the rollers. The saddle 29 is secured in its adjusted position by means of a set-screw 30, through a slot 31 in one end of the saddle. A guide 32 is secured to the head in position to receive the wire from the rollers and deliver it to the spool or form 33 being wound. The arrangement of these parts is such as to bend the wire in opposite directions as it is passing from the supply-spool to the field-spool, and thereby straighten it and at the same time spinning or winding it upon the field-spool evenly and with a uniform tension, and especially with square or irregular forms or spools. It will also permit the rollers to change their positions, so as to always lie in a line with the wire as it is being drawn from all points of the supply-spool. To prevent the weight of the supply-spool from throwing the parts out of their proper positions relatively to each other, and especially when run at a high rate of speed, the plate 9 may be supported on antifriction-rollers 34, mounted on the bed of the machine.

The head 11, which is provided with the fixed bearing for the end of the shaft 10, is mounted to slide longitudinally on top of the head of a carriage 35 and is provided at the front end with a plate 36, to which the form or spool 33 is secured by bolts and slots or other suitable means. The other end of the slide is provided with a perforated extension 37, through which a screw 38 is passed for the purpose of moving the slide upon the head while the machine is in motion, if desired. The carriage is mounted upon the bed or frame of the machine, so as to be reciprocally moved back and forth relatively to the flier-arm, whereby the wire from the guide of the arm is spun or wound around the form as the arm is carried around it by the operation of the machine, the carriage moving the distance of the diameter of the wire being used for every revolution of the flier-arm. In this way it will be seen that in the operation of the machine the carriage is moved in a direction parallel with the axis of rotation of the frame whereon the supply-spool is carried, and the head 11 is also adapted for movement in the same direction relatively to the carriage whereon it is mounted.

In winding the wire it is desirable that the carriage be moved automatically to lay the coils of wire evenly and uniformly, and for this purpose the machine is provided with a screw-threaded shaft 39, which is journaled at its ends in the frame of the machine and which is driven at a uniform rate of speed through suitable mechanism connecting it with the driving-pulley. An ordinary divided nut 40 detachably connects the carriage with the shaft and permits of the carriage being moved independently of the shaft, if desired. The direction of the movement of the carriage is changed by any suitable reversing mechanism capable of being operated by the movement of the carriage; but I prefer to use an electrically-operated reversing mechanism and have so shown it in the drawings.

Secured in brackets 41 upon the side of the bed or frame of the machine is a longitudinally-movable rod 42, the intermediate portion of which is provided with adjustable stops or collars 43. The carriage is provided with an apron 44, which extends down over the rod, and the front or left-hand end of the rod, as the machine is seen in Fig. 1, has a flange 44', as shown in Figs. 3, 8, and 14, which engages with the collar 43 at that end, and at the other end of the apron a slide 45 is mounted, so as to be moved into or out of the path of the collar 43 at that end of the apron, thereby permitting the carriage being moved to the end of the frame without changing the position of either one of the collars. This will permit of any number of forms or spools being wound upon the machine without making any changes in the adjustment of the parts after they have once been set.

Pivotally secured to the apron is an angular lever 46, the rear end of which fits between lugs 47 on the slide 45, and the front end of the lever carries a pinion 48, which is adapted to be thrown into or out of engagement with a rack 49 on the frame by the movement of the lever upon its pivot. The lever can be locked in either position by means of a set-screw 50, which projects through a suitable slot in the apron.

When it is desired to remove a completed spool from the machine and put an empty one in its place, the nut 40 is opened by separating the parts by a screw-threaded shaft 52, so as to be disengaged from the shaft 39, the lever 46 is unlocked, and the pinion 48 thrown into engagement with the rack 49 and rotated by means of the handle 51, which projects through a suitable slot in the apron. This movement of the lever throws the slide 45 down, so that it will pass the collar on the rod and permit of the carriage being moved back far enough to let the end of the spool pass the end of the shaft 10, which has been withdrawn from its fixed bearing in the head 11. After a new form has been secured to the plate 36 the carriage is returned to its former position by the rotation of the pinion, and the pinion is then thrown out of engagement with the rack and locked in that position. The nut 40 is closed upon the shaft 39 by means of the handled screw 52, which projects beyond the apron, which renders the machine automatic in its further movements.

The electrically-controlled shifter which I have shown comprises two parts, one part comprising a single-pole double-throw switch and the other part comprising the reversing mechanism. The switch is located in position to be operated by the rod 42 and consists of a plate 53, secured to the side of the machine and provided with contact-points 54, and a longitudinally-movable rod or switch 55, which is provided with contact-point 56 and is connected with the rod 42. Wires 57 and 58 lead from the contact-points of the plate to two solenoids 59 and 60, and two wires 61 and 62 lead from the switch 63 on the main line to the contact-points on the switch 55 and to the two solenoids, respectively. A plunger 64 is mounted within the solenoids, so as to be drawn into the one through which the current is passing and is connected intermediate its length with a lever 65. The contact-points at the ends of the solenoids may be conical, as shown at one end in Fig. 7, so as to give the greatest amount of surface for being magnetized. The lever 65 is pivotally secured to the platform 66, on which the solenoids are located, and has its rear end formed into a yoke which engages with a sliding double-ended clutch 67 on the shaft 39. The clutch is feathered to the shaft, so as to turn with it, and slides back and forth between two bevel-wheels that are loosely mounted on the shaft and with which it alternately engages for driving connection. The two wheels 68 and 69 are in mesh with a bevel-wheel 70, which is mounted on the rear portion of the platform and causes the wheels to rotate in opposite directions, so that the clutch and shaft will be caused to rotate in whichever direction the wheel is turning with which it is in engagement. The hub of the wheel 68 is provided with gear-teeth 71, or a separate wheel may be secured thereto, by means of which it receives motion from the driving mechanism of the machine through a shaft 72 and pinion 73.

The mechanism for operating the shaft 39 consists of a differential frictional gearing comprising a driven disk 74, which is journaled at the end of the machine, and a smaller driving-disk 75, feathered on a vertical shaft 76. The shaft 76 is journaled at one end in a bracket-bearing 77 on the head 3 and at the other end in a bracket 78 on the end of the machine and receives its motion from the main shaft through the bevel-gearing 79 and 80. Feathered to the shaft below the disk 75 is a collar 81, which is adjustably secured to the shaft by a set-screw 82 and has its upper end exteriorly screw-threaded. The hub of the disk 75 is also exteriorly screw-threaded, but in the opposite direction from the collar, and is secured to the shaft by a set-screw 83. An adjusting-nut 84 has its ends oppositely screw-threaded and engages with the threads of the collar and hub in such manner that by turning the nut after the hub has been released from the shaft a very fine adjustment of the disks may be secured for the different-sized wires that may be used. After the disk has been adjusted its set-screw is tightened and the parts will be held in their proper positions until it is desired to change them for another style of winding.

Secured to the disk 74 is a pinion 85, which meshes with a gear-wheel 86, which in turn meshes with a pinion 87 on the end of shaft 72 and thereby operates the pinion 73 and the reversing mechanism. The wheel 86 may be interchangeable and is secured on an arm 87', the opposite end of which is adjustably secured by means of a bolt 88 through the slot 89, whereby different-sized wheels may be used for different windings. By means of these adjustments the machine is adapted for a wide range of work, each of which can be adjusted to the utmost degree of accuracy.

In the operation of the machine a spool of wire, insulated or not, as the case may be, is placed in the winding-frame and the wire led through the opening in the plate at the base of the flier-arm, through the tension devices, over the guide, and to the form or spool to be wound, which has been secured to the carriage. Power is applied to the cone-pulley and the flier-arm caused to pass around the form or spool at the same time that the carriage is moved back and forth by the automatic feeding mechanism. As soon as the apron of the carriage comes in contact with either one of the collars on the shifting rod the rod is moved until a circuit is completed for passing a current of electricity through the coils of one of the solenoids, which will move the plunger and operate the reversing mechanism. This instantly reverses the direction of rotation of the screw-threaded shaft, which causes the carriage to move in the opposite direction. As soon as the apron engages with the other collar on the rod the rod is again shifted so as to complete a circuit through the coils of the other solenoid, which will draw the plunger into said solenoid and thus operate the reversing mechanism and move the carriage in the opposite direction. When a spool is completed, the automatic mechanism is thrown out of gear and the carriage moved back by the manual mechanism and the spool taken off and a new one put in its place and the carriage moved forward and the change made back to the automatic mechanism.

Whenever a different-sized spool of wire is to be used, or any other change made, the driving mechanism must be adjusted to the new conditions, after which as many spools of that style may be wound as desired without further change or alteration.

The construction of the machine permits of its being changed quickly from one style spool to another and also permits of its being used for winding other spools than those for electrical purposes.

Having described my invention, I claim—

1. In a field-spool winder, the combination of a support, two parts mounted on said support, namely, a rotatively-mounted frame provided with means for removably supporting a supply-spool and a carriage having means for moving one of said parts relatively to the other part in a direction parallel to the axis of rotation of the frame, substantially as set forth.

2. In a field-spool winder, the combination of a support, a frame rotatively mounted thereon and provided with means for supporting a supply-spool, a carriage at one end of said frame and alined with the axis of rotation thereof, said carriage being adapted to support a spool to be wound, a flier-arm projecting from the end of said rotatively-mounted frame and arranged to traverse the periphery of the spool held on the carriage, and means for moving the carriage relatively to the frame in a direction parallel to the axis of rotation of the frame, substantially as set forth.

3. In a field-spool winder, the combination of a support, two parts mounted on said support, namely, a rotatively-mounted frame provided with means for supporting a supply-spool mounted to turn with its axis at right angles to the axis of rotation of the rotatively-mounted frame and a carriage having means to support a spool to be wound, and means for moving one of said parts relatively to the other part in a direction parallel to the axis of rotation of the frame, substantially as set forth.

4. In a field-spool winder, the combination of a support, two parts mounted on said support, namely, a rotatively-mounted frame and a carriage having means to support a spool to be wound, means for moving one of said parts relatively to the other part in a direction parallel to the axis of rotation of said frame, and bearing devices at opposite sides of said frame alined with each other and having their axes at right angles to the axis of rotation of the frame, said bearing devices being adapted to hold a supply-spool, substantially as set forth.

5. In a field-spool winder, the combination, with a support, of a frame rotatably mounted thereon, the side pieces of which are each provided with a bearing, a sleeve in each bearing, the inner end of which is tapered, a shaft through the sleeves, a nut on each end of the shaft, a brake, a flier-arm, a carriage provided with means for supporting the spool to be wound, and means for reciprocally changing the position, longitudinally, of said frame and carriage relatively to each other, substantially as set forth.

6. In a field-spool winder, the combination, with a support, of a frame rotatably mounted thereon provided with means for supporting a supply-spool, a flier-arm, a head upon the outer end of the arm, a spring-actuated shaft through the arm and connected with the head, a guide and tension devices on the head, a carriage provided with means for supporting the spool to be wound, and means for reciprocally changing the position, longitudinally, of said frame and carriage relatively to each other, substantially as set forth.

7. In a field-spool winder, the combination, with a support, of a frame rotatably mounted thereon provided with means for supporting a supply-spool, a flier-arm, the outer end of which is provided with a swiveled head, a saddle secured to the head, two wheels journaled in the saddle, an adjustable saddle secured to the first-mentioned saddle, a tension-roller mounted in the adjustable saddle, a carriage provided with means for supporting the spool to be wound, and means for reciprocally changing the position, longitudinally, of said frame and carriage relatively to each other substantially as set forth.

8. In a field-spool winder, the combination, with a support, of a frame rotatably mounted thereon provided with means for supporting a supply-spool, a flier-arm, a carriage, a longitudinally-movable head on the carriage, the inner end of which is provided with a disk for supporting the spool to be wound, and the other end is provided with a projection, a screw through the projection, and means for reciprocally changing the position, longitudinally, of said frame and carriage relatively to each other, substantially as set forth.

9. In a field-spool winder, the combination, with a support, of a frame rotatably mounted thereon, provided with means for supporting a supply-spool, a shaft projecting from the outer end of said frame, a flier-arm, a carriage, a head on the carriage provided with a hollow extension and with means for supporting the spool to be wound, and means for reciprocally changing the position, longitudinally, of said frame and carriage relatively to each other, substantially as set forth.

10. In a field-spool winder, the combination, with a support, of a frame rotatably mounted thereon provided with means for supporting a supply-spool, a carriage reciprocally mounted on the main support, provided with means for supporting the spool to be wound, reversible mechanism for moving the carriage, and means controlled by the movement of the carriage for reversing said carriage - moving mechanism, substantially as set forth.

11. In a field-spool winder, the combination, with a support, of a frame rotatably mounted thereon, a reciprocally-movable carriage on the support, automatic or manually operated mechanism for moving the carriage, and electrically-controlled means for reversing the automatic mechanism, substantially as set forth.

12. In a field-spool winder, the combination, with a support, of a frame rotatably mounted thereon, a reciprocally-movable carriage on the support, automatically or manually operated means for moving the carriage, one of which is thrown out of gear when the other one is thrown in, and electrically-controlled reversing mechanism for the automatic means, substantially as set forth.

13. In a field-spool winder, the combination, with a support, of a frame rotatably mounted thereon, a reciprocally-movable carriage, an apron on the carriage, a rod provided with adjustable collars, a lever pivotally secured to the apron, one end of which carries means for operating the carriage manually, a slide connected with the other end, said slide being adapted to be thrown into or out of engagement with one of the collars, means for automatically moving the carriage, and electrically-controlled reversing mechanism connected with the rod, substantially as set forth.

14. In a field-spool winder, the combination, with a support, of a frame rotatably mounted thereon, a reciprocally-movable carriage on the support, automatic reversing mechanism for moving the carriage, two solenoids and a plunger for moving the reversing mechanism, and a single-pole double-throw switch for completing a circuit through the solenoids, and means upon the carriage for throwing the switch, substantially as set forth.

15. In a field-spool winder, the combination, with a support, of a frame rotatably mounted thereon, a reciprocally-movable carriage, a screw-threaded shaft connected with the carriage, a double-ended clutch upon the shaft, a lever for moving the clutch, two solenoids and a plunger for moving the lever, a single-pole double-throw switch, for completing a circuit through the solenoids, and means for operating the switch by the movement of the carriage, substantially as set forth.

16. In a field-spool winder, the combination, with a support, of a frame rotatably mounted thereon, a reciprocally-movable carriage, a screw-threaded shaft connected with the carriage, two bevel-wheels and a double clutch on one end of the shaft, a bevel-wheel in mesh with said two wheels, a lever for moving the clutch, and electrically-controlled mechanism for operating the lever, substantially as set forth.

17. In a field-spool winder, the combination, with a support, of a frame rotatably mounted thereon, a reciprocally-movable carriage, automatic reversing mechanism for the carriage, a driven disk for operating the reversing mechanism, a driving-disk connected with the main shaft of the machine, and means for adjusting said disks relatively to each other, substantially as set forth.

18. In a field-spool winder, the combination, with a support, of a frame rotatably mounted thereon, a reciprocally-movable carriage, a shaft for moving the carriage, one end of which is provided with automatically-controlled reversing mechanism, a shaft for operating the reversing mechanism provided with a pinion, a disk and a pinion journaled at the end of the support, an interchangeable wheel between said pinions, and a driving-disk connected with the main shaft of the machine and in engagement with the driven disk, substantially as set forth.

19. In a field-spool winder, the combination, with a support provided with means for winding a spool, of a driven disk at one end of the support for controlling the winding mechanism, a vertically-journaled shaft in front of the disk, a driving-disk thereon, the hub of which is screw-threaded, an adjustable screw-threaded collar on the shaft below the disk, the screw-threads of the hub and the collar being in opposite directions, and an adjusting-nut on said hub and collar, substantially as set forth.

20. In a field-spool winder, the combination of a support, two parts mounted on said support, namely, a rotatively-mounted frame adapted to carry a supply-spool and a carriage for the spool to be wound, means for moving one of said parts relatively to the other part in a direction parallel to the axis of rotation of the frame, a flier-arm carried on the frame, a swiveled head on said arm, a guide and tension devices on the head, and a spring for holding said head elastically in position, substantially as set forth.

21. In a field-spool winder, the combination of a support, a frame rotatively mounted on the support and adapted to carry a supply-spool, a carriage mounted on the support for movement in a direction parallel to the axis of rotation of the frame, and a head on the carriage also mounted for movement relatively to the carriage in a direction parallel to the axis of rotation of the frame and adapted to support a spool to be wound, substantially as set forth.

22. In a field-spool winder, the combination of a support, two parts mounted on said frame, namely, a rotatively-mounted frame adapted to carry a supply-spool and a carriage for the spool to be wound, one of said parts being movable longitudinally in a direction parallel to the axis of rotation of the frame, means for driving the frame, gearing actuated from said driving means for imparting longitudinal movement to the movable part relatively to the other part, and means for throwing said gearing out of operation to permit the movable part to be moved longitudinally independently of said driving mechanism, substantially as set forth.

23. In a field-spool winder, the combination of a support, a frame rotatively mounted thereon, a reciprocally-moving carriage on the frame, reversible mechanism for moving the carriage, a manually-operated mechanism for moving the carriage, and means for simultaneously throwing one of said carriage-moving mechanisms out of and the other mechanism into operation, substantially as set forth.

24. In a field-spool winder, the combination of a support, two parts mounted thereon, namely, a rotatively-mounted frame and a carriage for the spool to be wound, one of said parts being movable in a direction parallel to the axis of rotation of said frame, reversible mechanism for moving said movable part, and electrical devices actuated by the movement of said movable part for controlling said reversible mechanism, substantially as set forth.

25. In a field-spool winder, the combination of a support, a frame rotatively mounted thereon, a reciprocally-movable carriage, a screw-threaded shaft connected to the carriage, two bevel-wheels and a double clutch on one end of the shaft, a bevel-wheel in mesh with said two wheels, a lever for moving the clutch, and means actuated by the movement of the carriage for operating said lever, substantially as set forth.

26. In a field-spool winder, the combination of a support, a rotatively-mounted frame adapted to carry a supply-spool, a disk on the end of the frame, a carriage adapted to support a spool to be wound, a flier-arm on the disk arranged to traverse the spool held on the carriage, and antifriction-rollers arranged under the disk and in contact with the periphery thereof to support the same, substantially as set forth.

WILLIAM LEIST.

Witnesses:
JOHN E. JONES,
FRANK TODD.